Jan. 5, 1965 R. J. LONG 3,164,731
TAPE CONTROLLED PROGRAMMER
Filed Feb. 27, 1961

United States Patent Office 3,164,731
Patented Jan. 5, 1965

3,164,731
TAPE CONTROLLED PROGRAMMER
Robert J. Long, Pasadena, Calif., assignor to Crestmont Consolidated Corporation, San Marino, Calif., a corporation of California
Filed Feb. 27, 1961, Ser. No. 91,803
2 Claims. (Cl. 307—115)

This invention relates to a tape controlled programmer which may be utilized as a master control center to selectively control the operation of a plurality of remote control units.

With the advancement in industrial manufacturing and production techniques, it has become desirable to provide means which centrally and automatically control the operation of the various units in industrial processes. Generally, in the past, devices providing such control have included extensive mechanical coupling arrangements and large quantities of electrical circuitry. Due, in part, to their electro-mechanical arrangement, these devices are usually quite expensive and are not readily adaptable to changes in the requirements of the processes being controlled. Thus, for each new process it is necessary to substantially rearrange or replace portions of the control device.

The present invention, on the other hand, provides an inexpensive central control unit which utilizes a minimum of mechanical and electrical circuitry to automatically control a plurality of remote control units. In particular, the present invention provides a tape controlled programmer which may be utilized as a master control in industrial processes and which is readily adaptable to any changes in the requirements of the processes being controlled.

To provide the above, the present invention in a basic form includes a punched tape which is driven at a constant rate of speed between a pair of contacts. When a punched hole passes between the pair of contacts an electrical circuit is momentarily closed to operate a switching device. The switching device being in turn connected to a remote unit, thus selectively controls the operation of the remote unit.

Since the control tape moves at a constant rate, distance along the tape represents time. Thus, by selectively punching the tape, any program of operation may be set up or modified for any number of control units. Further, in accordance with the present invention, the tape may be removed and replaced by a new tape, thereby allowing completely new programs to be set up. Thus, the present invention provides a completely flexible program control for remotely located motors, air and hydraulic valves and/or a plurality of other remote control units.

Figure 1:
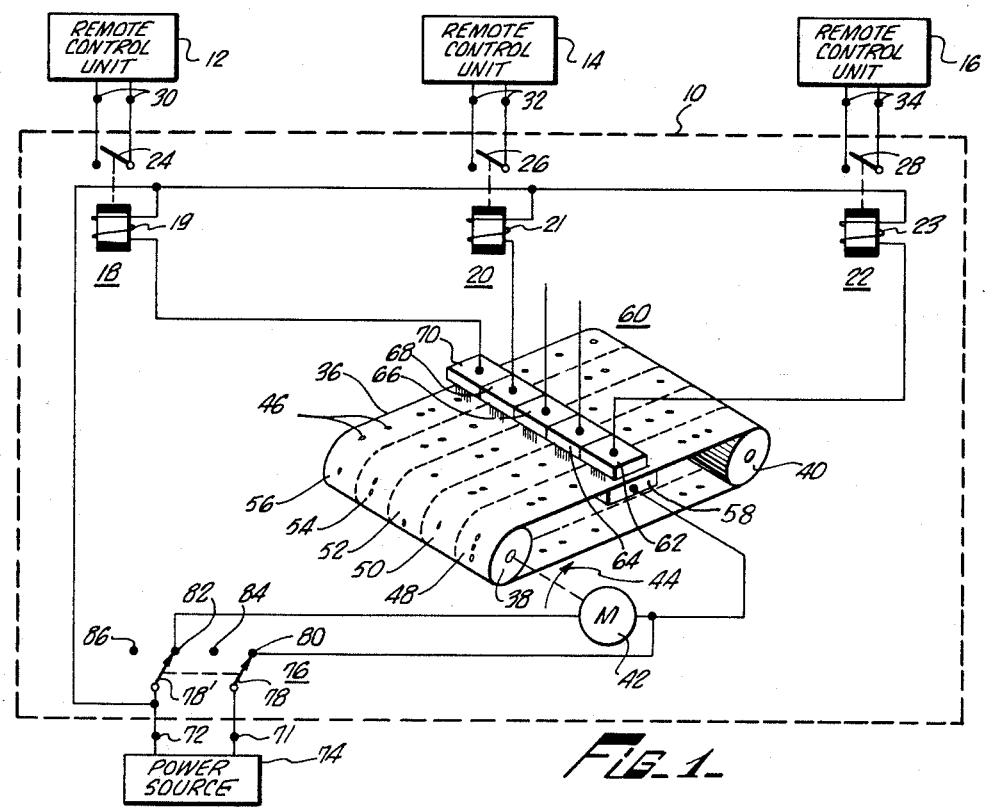
Figure 2:
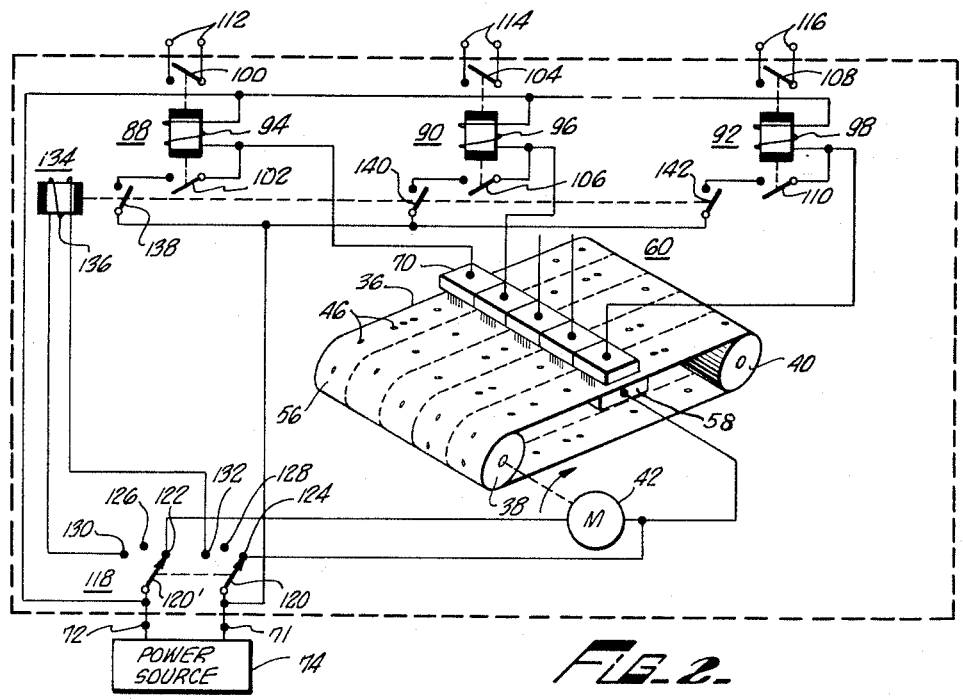

The above, as well as other features of the present invention, may be more fully understood by reference to the following detailed description, when considered with the drawings, in which:

FIG. 1 is a diagrammatic representation of a basic form of the present invention; and, FIG. 2 is a diagrammatic representation of a preferred embodiment of the present invention.

Referring to FIG. 1 in detail, there is illustrated a tape controlled programmer depicted by the dotted line rectangle 10. The operation of the programmer 10 controls a plurality of remote control units, three of which are represented respectively at 12, 14 and 16. The operation of the remote control units 12 through 16 is controlled by the operation of a switching means. The switching means may take a number of forms. For example, the switching means may be pulse relays, flipflops, solenoids, polarized relays or other bistable devices. By way of illustration only, the basic form of the present invention is represented as including pulse relays, three of which are represented at 18, 20 and 22. A signal applied to the control windings 19, 21 and 23 of the relays 18, 20 and 22, respectively, causes the relays to be actuated, the removal of the signal causing them to release. These pulse relays control the operation of associated normally open switches 24, 26 and 28, which in turn, are coupled to pairs of output terminals 30, 32 and 34, respectively. Thus, the operation of the relays 18, 20 and 22 closes the normally open switches 24, 26 and 28, thereby providing a closed circuit connection to the associated remote control units 12, 14 and 16. This closed circuit connection is then utilized to control the operation, such as stop and start of each remote unit.

In accordance with the present invention, the operation of the relays 18, 20 and 22 is selectively controlled by a control tape 36. By way of example only, the control tape 36 is represented as being a continuous tape extending between tape spools 38 and 40. As illustrated in FIG. 1, the movement of the control tape 36 is controlled by the operation of a motor drive 42. More particularly, the motor 42 is mechanically coupled to the tape spool 38. As represented by arrow 44, the operation of motor 42 causes the tape spool 38 to rotate in a clockwise direction, moving the control tape 36 at a constant rate of speed.

In order that the control tape 36 may selectively control the operation of the pulse relays and in turn the remote control units, control information is coded on the tape 36. In accordance with the present invention this information takes the form of holes, such as 46, which are selectively punched in the tape 36. Since the tape 36 moves at a constant rate, distance along the tape represents time. Accordingly, by punching holes at selective distances a coded signal may be set up which provides a program of operation for each remote unit being controlled.

Particularly, as represented in FIG. 1, the holes 46 are aligned to form a plurality of tape channels 48, 50, 52, 54 and 56. These tape channels extend the length of tape 36 and are parallel to each other and to the edge of tape 36. Each tape channel is shown as being associated with a particular control unit. Thus, the holes of each tape channel represent a program of operation for one of the remote control units.

To read the information represented by the punched holes to control the operation of the relays 18, 20 and 22, the control tape 36 is caused to move between a pair of electrical contacts. In the basic form of the present invention, these electrical contacts include a shoe of current-conductive material 58 and a read head assembly 60. As represented, the read head assembly 60 includes a plurality of read contacts 62, 64, 66, 68 and 70. As shown, a read contact is associated with each tape channel. These read contacts may take a number of different forms. However, in a preferred embodiment of the invention, the read contacts include an arrangement having brush contacts which rest upon the surface of the control tape 36. Thus, as the control tape 36 is moved between the shoe 58 and the read head assembly 60, momentary electrical contact is made when a punched hole passes therebetween. Since, as represented, a read contact is connected to the control winding of each relay, the momentary electrical connection between the shoe 58 and the associated read contacts provide an electrical connection to the control winding of the associated pulse relays. Thus, a signal applied between the control winding of each of the pulse relays 18, 20 and 22 and the shoe 58 causes each of the pulse relays to be momentarily actuated in response to each electrical contact made between its associated read contact and the shoe 58. Accordingly, the normally open switches associated with the pulse relays are operated to selectively control the operation of the associated remote control units.

To provide such an electrical signal as well as electrical power for driving the motor 42, the programmer 10 is coupled at input terminals 71 and 72 to a power source 74. By way of example, power source 74 may provide a 115 volt 60 cycle signal such as that normally obtained from a wall socket electrical connection. To connect the electrical signal generated by the power source 74 to the motor 42 as well as between the shoe 58 and the motor winding of each of the relays 18, 20 and 22, a manually operated master control switch 76 is provided.

As illustrated, the master control switch 76 provides an "on" position represented by the connection of an armature arrangement 78 to contacts 80 and 82, and an "off" position represented by contacts 84 and 86. When the master control switch 76 is in an "on" position, an electrical signal is applied to the motor 42 thereby causing the tape 36 to move in the manner described above. Further, the electrical signal from source 74 is also connected between the shoe 58 and the control winding of each of the relays 18, 20 and 22. Accordingly, when an electrical contact is made between the shoe 58 and one of the read contacts, a circuit is closed from power source 74 through the shoe 58 and read head assembly 60 to the associated relay causing it to operate. The actuation of the relay causes the associated normally open switch to close, thereby allowing the remote control unit associated therewith to operate. This operation will be repeated for the relays 18, 20 and 22 each time an electrical circuit connection is made between the shoe 58 and the read contact associated therewith.

From the above, it is seen that in a basic form, the present invention provides a tape controlled programmer in which information represented by spaced holes punched in a control tape is translated by a pair of electrical contacts and a switching means to selectively control the operation of remote units connected thereto.

As previously mentioned, the switching means of the present invention may take a number of forms. In FIG. 1 the switching means is represented as including a plurality of pulse relays. As is commonly known, such relays remain actuated as long as a signal is applied thereto. Thus, such relays may find particular use in controlling the operation of pulse-operated remote control units. However, when the type of control to be provided for a remote unit is of a sustained "on" or "off" nature, it may be desired to utilize switching means which do not require a constant current drain to provide an "on" circuit connection. Accordingly, in another embodiment of the present invention, the switching means may include a plurality of bistable devices, that is, switching devices which operate in response to a first signal to change to a first stable state and operate to change to a second stable state in response to a second signal. Such bistable devices may take a number of forms, such as flip-flops or polarized relays.

In a preferred embodiment of the present invention, as represented in FIG. 2, the bistable switching devices comprise latching relays. As is commonly known, latching relays operate between two stable mechanical conditions. In response to a first signal applied to the latching relays, contacts associated therewith are caused to open and remain open until a second signal is applied to the latching relay. At this time, the open contacts close and remain closed until another signal is applied to the latching relay. Accordingly, such latching relays provide a preferred form of sustained "on" or "off" switch connection for remote units connected to the tape control programmer of the present invention.

Referring now to FIG. 2, there is shown within the dotted line rectangle 10 a preferred embodiment of the tape controlled programmer of the present invention. As illustrated, the programmer includes a tape control assembly substantially as shown and described in connection with FIG. 1. Accordingly, as the control tape 36 moves at a constant rate between the pair of contacts, represented by the shoe 58 and the read head assembly 60, momentary electrical contacts are made through the punched holes passing therebetween. In a manner similar to that described in connection with FIG. 1, the making of the electrical connections between the shoe 58 and the read head assembly 60 provides means for selectively controlling the operation of switching means which, in turn, control the operation of associated remote control units.

As previously mentioned and as particularly shown in FIG. 2, the switching means of the preferred embodiment of the present invention includes a plurality of latching relays, three of which are represented at 88, 90 and 92. As represented, these latching relays include control windings 94, 96 and 98, respectively. As is further illustrated, the latching relays each control the operation of a pair of switches. In particular, latching relay 88 controls the operation of initially open switches 100 and 102; latching relay 90 controls the operation of initially open switches 104 and 106; and latching relay 92 controls the operation of initially open switches 108 and 110. As shown, switches 100, 104 and 108 are connected to output terminals represented at 112, 114 and 116, to which remote control units may be individually connected. As is further shown in FIG. 2, the initially open switches 102, 106 and 110 include armatures which are respectively connected to one terminal of the control winding of the latching relay associated therewith.

To control the latching relays in response to the making of electrical contact between the read head assembly 60 and the shoe 58, a read contact of the read head assembly 60 is connected to the aforementioned one terminal of the control windings of each latching relay. Accordingly, a control winding such as 94 is electrically connected to the shoe 58 when electrical contact is made between the read contact 70 and the shoe 58. Thus, by application of an electrical signal between the shoe 58 and the control winding of each of the latching relays, each latching relay is caused to operate in response to the momentary electrical contact made between an associated read contact and the shoe 58. As previously mentioned, the operation of the latching relay causes the switches associated therewith, if initially open, to close and remain closed until another signal is applied to the latching relay. Accordingly, when an electrical signal is applied to the control windings of the latching relays 88, 90 and 92, the initially open switches associated therewith close and remain closed until another electrical signal is applied to the windings of the latching relays.

In order that such an electrical signal may be applied to the control windings of the latching relays, a power source such as 74, described in connection with FIG. 1, is connected to the input terminals of the programmer. In particular, to provide such a connection, the tape programmer 10 includes a master control switch 118. As illustrated, master control switch 118 is a three-position switch. In particular, the master control switch 118 includes an "on" position represented by the armature arrangement 120 impinging upon the contacts 122 and 124, an "off" position represented by the contacts 126 and 128, and a momentary "on" position represented by the contacts 130 and 132. In particular, in accordance with a preferred form of the present invention, the master control switch 118 is a spring-loaded toggle switch. Thus, the master control switch 118 may be manually controlled to move armature 120 to contact the momentary "on" contact positions 130 and 132. Due to the spring loading, however, such a contact position is not maintained. In particular, when the armature 120 is moved to the momentary "on" position, it will automatically return to the "off" contact position represented by the contacts 126 and 128.

With the master control switch 118 in an "on" position as represented in FIG. 2, an electrical signal is applied to the motor 42 to drive the control tape 36. Further, an electrical signal is applied between the shoe 58 and the control winding of each of the latching relays 88, 90 and 92. Accordingly, when an electrical contact is made between a read contact and the shoe 58, an associated latching relay is operated. As previously mentioned, this causes the associated switches to either open or close, thereby initiating an "on" or "off" condition at the remote control unit associated therewith. Accordingly, the momentary electrical contacts made through the punched holes in the control tape 36 selectively control the operation of a plurality of remote control units.

Generally, in process control systems, it is desired that means be provided for releasing or de-energizing all operating units. This provides protection for failures at any point in the industrial processes which might damage the control units or the entire process. In the preferred embodiment of the present invention, means are provided for centrally and selectively releasing all operating remote control units connected to the programmer. In particular, the means is connected to the master control switch 118, and selectively releases the switches associated with the latching relays which are in a closed position while maintaining the release of the switches which are in an open position.

In particular, as represented in FIG. 2, the means for releasing all closed initially open switches includes a relay 134 having a control winding 136 connected across the momentary "on" contacts 130 and 132. As illustrated, the operation of the relay 134 controls a plurality of normally open switches 138, 140 and 142, one of which is associated with each latching relay. In particular, the normally open switch 138 is connected in series between the initially open switch 102 of the latching relay 88 and the input terminal 71; the normally open switch 140 is connected in series between the initially open switch 106 of the latching relay 90 and the input terminal 71; and the normally open switch 142 is connected between the initially open switch 110 of the latching relay 92 and the input terminal 71. Accordingly, when the armature arrangement 120 is moved to the momentary "on" contact position, an electrical signal passes through the control winding 136 of the relay 134 causing it to momentarily operate. The momentary operation of the relay 134 momentarily closes the normally open switches 138, 140 and 142. Thus, if the initially open switches associated with any of the latching relays are in a closed position, an electrical circuit is momentarily formed from the power source through the control winding of the associated latching relay. This will cause the associated latching relay to operate thereby opening the closed initially open switches.

Accordingly, from the above description, it will be apparent that the present invention provides a tape controlled programmer which utilizes a minimum of electrical and mechanical circuitry to automatically and selectively control a plurality of remote units. Further, due to the particular tape control arrangement, the program of operation of any remote unit may be modified or completely changed by either adding punched holes to the control tape or by replacing the tape. Accordingly, complete flexibility of operation control is provided at a minimum of expense.

What is claimed is:
1. A tape controlled programmer comprising: a control tape having holes punched therein, said holes being aligned to form a plurality of tape channels; an electrical contact means; means for moving said control tape over said electrical contact means; a read head assembly including a plurality of read contacts, at least one read contact being associated with each tape channel, said read contacts being positioned to make an electrical contact with said electrical contact means when said read contacts impinge upon holes in said control tape; a plurality of latching type relays, each including a control winding and a first and a second initially open switch, said first initially open switch being connected to a pair of output terminals and said second initially open switch being connected to a first terminal of said control winding; means for connecting said first terminal of the control winding to each of said latching type relays to a different read contact; a reset relay having a control winding and a plurality of normally open switches, each normally open switch being connected in series with the second initially open switch of a different latching type relay; a source of electrical signals; means for connecting each of the normally open switches of the reset relay to the source of electrical signals; means for connecting the source of electrical signals to the second terminal of the control winding of each latching type relay; and a master control switch having at least first and second positions, the first position connecting the source of electrical signals to the electrical contact means and the second position connecting the source of electrical signals across the control winding of the reset relay to cause the normally open switches of the reset relay to momentarily close.

2. A programmer comprising: a control tape having holes punched therein, said holes being aligned to form a plurality of tape channels; an electrical contact means; means for moving said control tape over said electrical contact means; a read head assembly including a plurality of read contacts, at least one of said read contacts being associated with each tape channel, said read contacts being positioned to make momentary electrical contact with electrical contact means through the holes of said associated tape channels as said control tape moves over said electrical contact means; a plurality of bistable devices each having a pair of input terminals, said bistable devices being initially in a first stable state and being responsive to a signal applied to said input terminals to change to a second stable state; selectively operable switching means for applying an electrical signal to the input terminals of all bistable devices in a second stable state; means for connecting one of said input terminals of each bistable device to a read contact; means for applying an electrical signal between said electrical contact means and a remaining input terminal of each of said bistable devices; and output means coupled to each of said bistable devices.

References Cited in the file of this patent
UNITED STATES PATENTS

| | | |
|---|---|---|
| 2,576,903 | Imm | Nov. 27, 1951 |
| 2,656,109 | Lindars | Oct. 20, 1953 |
| 2,910,534 | Cunningham | Oct. 27, 1959 |
| 2,961,286 | Meyers | Nov. 22, 1960 |